(12) United States Patent
Morioka

(10) Patent No.: US 11,956,821 B2
(45) Date of Patent: *Apr. 9, 2024

(54) COMMUNICATION DEVICE, COMMUNICATION CONTROL METHOD, AND PROGRAM

(71) Applicant: Sony Group Corporation, Tokyo (JP)

(72) Inventor: Yuichi Morioka, Kanagawa (JP)

(73) Assignee: SONY GROUP CORPORATION, Tokyo (JP)

(*) Notice: Subject to any disclaimer, the term of this patent is extended or adjusted under 35 U.S.C. 154(b) by 470 days.

This patent is subject to a terminal disclaimer.

(21) Appl. No.: 17/221,851

(22) Filed: Apr. 5, 2021

(65) Prior Publication Data

US 2021/0227583 A1 Jul. 22, 2021

Related U.S. Application Data

(63) Continuation of application No. 16/324,575, filed as application No. PCT/JP2017/028237 on Aug. 3, 2017, now Pat. No. 10,999,867.

(30) Foreign Application Priority Data

Oct. 14, 2016 (JP) ................. 2016-202755

(51) Int. Cl.
*H04W 74/08* (2009.01)
*H04W 74/0816* (2024.01)
(Continued)

(52) U.S. Cl.
CPC ....... *H04W 74/0816* (2013.01); *H04W 84/12* (2013.01); *H04L 2101/604* (2022.05); *H04L 2101/622* (2022.05)

(58) Field of Classification Search
CPC ...................................... H04W 84/12
(Continued)

(56) References Cited

U.S. PATENT DOCUMENTS

2013/0235720 A1 9/2013 Wang et al.
2015/0304377 A1 10/2015 Chitrakar et al.
(Continued)

FOREIGN PATENT DOCUMENTS

JP 2008-252867 A 10/2008
JP 2018519713 A 7/2018
(Continued)

OTHER PUBLICATIONS

International Search Report dated Oct. 24, 2017 for PCT/JP2017/028237 filed on Aug. 3, 2017, 9 pages including English Translation.

(Continued)

*Primary Examiner* — Angel T Brockman
(74) *Attorney, Agent, or Firm* — XSENSUS LLP

(57) ABSTRACT

[Object] To enable the communication device that has received a response frame to determine whether or not the response frame is a signal of the own BSS, while ensuring downward compatibility.
[Solution] Provided is a communication device including: a generation unit configured to generate a response frame prescribed in IEEE802.11 by setting a value corresponding to a BSS to which the own device belongs in a receiving station address field of the response frame; and a transmission unit configured to transmit the response frame.

12 Claims, 15 Drawing Sheets

(51) Int. Cl.
  *H04W 84/12* (2009.01)
  *H04L 101/604* (2022.01)
  *H04L 101/622* (2022.01)

(58) Field of Classification Search
  USPC .......................................................... 370/338
  See application file for complete search history.

(56) References Cited

U.S. PATENT DOCUMENTS

| | | |
|---|---|---|
| 2016/0142980 A1 | 5/2016 | Lee |
| 2016/0330663 A1 | 11/2016 | Zhou et al. |
| 2017/0171723 A1 | 6/2017 | Adachi |
| 2017/0289987 A1 | 10/2017 | Seok |
| 2019/0182868 A1* | 6/2019 | Morioka ........... H04W 74/0816 |

FOREIGN PATENT DOCUMENTS

| | | |
|---|---|---|
| RU | 2598035 C1 | 9/2016 |
| WO | 2016/032007 A1 | 3/2016 |
| WO | 2016/087917 A1 | 6/2016 |
| WO | 2016/179548 A1 | 11/2016 |

OTHER PUBLICATIONS

Partial Supplementary Search Report issued in European Application 17860909.5-1214 dated Oct. 8, 2019.

* cited by examiner

FIG. 3

[UNIT: OCTET]

| | 2 | 2 | 6 | 4 |
|---|---|---|---|---|
| 30 | FRAME CONTROL | DURATION | RECEIVING STATION ADDRESS | FCS |
| | 31 | 32 | 33 | 34 |

BSS IDENTIFICATION INFORMATION
VALUE OF HIGHER-ORDER 4 BITS: "1010"

ASSIGNED ADDRESS

INFORMATION
IN WHICH PART OF
MAC ADDRESS IS OMITTED

BSS
IDENTIFICATION
INFORMATION

VERSION IDENTIFICATION INFORMATION
VALUE OF LOWER-ORDER 4 BITS: "1111"

COMMUNICATION DEVICE, COMMUNICATION CONTROL METHOD, AND PROGRAM

CROSS-REFERENCE TO RELATED APPLICATIONS

This is a continuation of U.S. application Ser. No. 16/324,575, filed Feb. 11, 2019, which is based on PCT filing PCT/JP2017/028237, filed Aug. 3, 2017, and claims priority to 2016-202755, filed in the Japanese Patent Office on Oct. 14, 2016, the entire contents of each of which are being incorporated herein by reference.

TECHNICAL FIELD

The present disclosure relates to a communication device, a communication control method, and a program.

BACKGROUND ART

In recent years, a working group of IEEE802.11, and the like have been considering standardization of a new wireless LAN, which includes consideration of a method for setting a transmission prohibition period (hereinafter referred to as "network allocation vector (NAV)" for convenience).

Patent Literature 1 discloses a setting method and a canceling method for NAVs based on a transmission request frame (hereinafter referred to as "request to send (RTS)" for convenience) or a reception preparation completion frame (hereinafter referred to as "clear to send (CT S)" for convenience).

CITATION LIST

Patent Literature

Patent Literature 1: JP 2008-252867A

DISCLOSURE OF INVENTION

Technical Problem

Here, in regard to NAV setting based on a response frame, for example, the following have been under consideration: determining, by a station device (hereinafter referred to as "station (STA)" for convenience), whether or not a response frame is a signal of the station device's own basic service set (BSS), and setting an NAV in accordance with a result of the determination.

Here, a frame format of a response frame does not include a transmitting station address field. Consequently, for example, in the case where a certain STA receives a response frame transmitted to another STA by an access point device (hereinafter referred to as "access point (AP)" for convenience), it cannot determine whether or not the response frame is a signal of the own BSS on the basis of whether or not address information of an AP is set in the transmitting station address field.

In addition, measures such as providing a new field including BSS identification information in a frame format of a response frame cannot ensure downward compatibility. That is, an STA supporting a low order version cannot appropriately process a response frame having the frame format.

Hence, in view of the above circumstances, the present disclosure provides a novel and improved communication device, communication control method, and program that enable the communication device that has received a response frame to determine whether or not the response frame is a signal of the own BSS, while ensuring downward compatibility.

Solution to Problem

According to the present disclosure, there is provided a communication device including: a generation unit configured to generate a response frame prescribed in IEEE802.11 by setting a value corresponding to a BSS to which the own device belongs in a receiving station address field of the response frame; and a transmission unit configured to transmit the response frame.

In addition, according to the present disclosure, there is provided a communication control method executed by a computer, including: generating a response frame prescribed in IEEE802.11 by setting a value corresponding to a BSS to which an own device belongs in a receiving station address field of the response frame; and transmitting the response frame.

In addition, according to the present disclosure, there is provided a program causing a computer to implement: generating a response frame prescribed in IEEE802.11 by setting a value corresponding to a BSS to which an own device belongs in a receiving station address field of the response frame; and transmitting the response frame.

In addition, according to the present disclosure, there is provided a communication device including: a reception unit configured to receive a response frame that is prescribed in IEEE802.11 and includes a value corresponding to a BSS in a receiving station address field; and a specification unit configured to specify whether or not the response frame is a signal of an own BSS on the basis of the value.

In addition, according to the present disclosure, there is provided a communication control method executed by a computer, including: receiving a response frame that is prescribed in IEEE802.11 and includes a value corresponding to a BSS in a receiving station address field; and specifying whether or not the response frame is a signal of an own BSS on the basis of the value.

In addition, according to the present disclosure, there is provided a program causing a computer to implement: receiving a response frame that is prescribed in IEEE802.11 and includes a value corresponding to a BSS in a receiving station address field; and specifying whether or not the response frame is a signal of an own BSS on the basis of the value.

Advantageous Effects of Invention

According to the present disclosure as described above, the communication device that has received a response frame can determine whether or not the response frame is a signal of the own BSS, while downward compatibility is ensured.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 illustrates a frame format of a CTS.

MODE(S) FOR CARRYING OUT THE INVENTION

Figure 1:
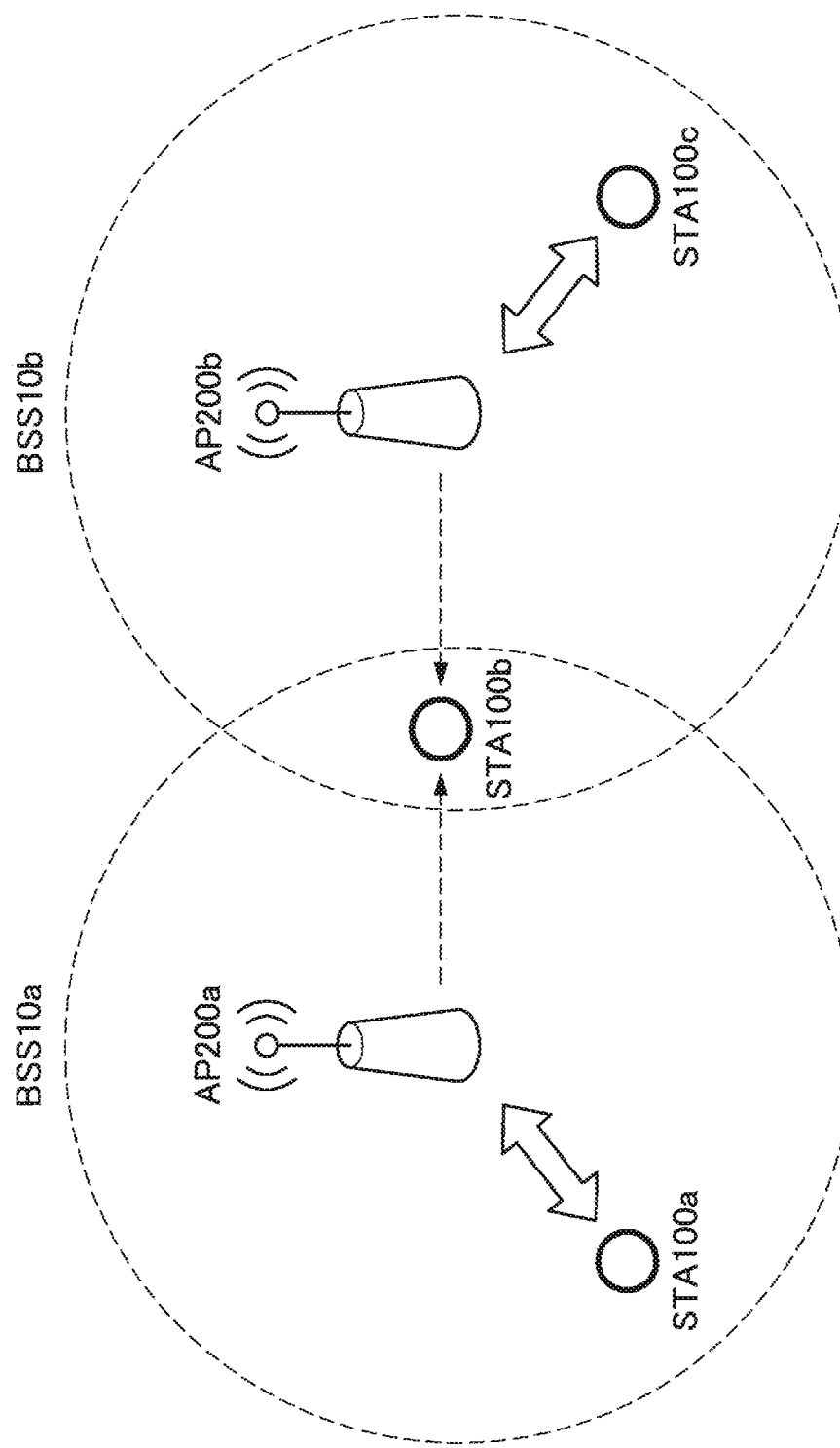
FIG. 1 illustrates a configuration of a wireless LAN system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be given in the following order.
1. Overview of wireless LAN system
2. Configuration of device
3. Operation of STA
4. First modification
5. Second modification
6. Application examples
7. Others
8. Conclusion 1. Overview of Wireless LAN System An embodiment of the present disclosure relates to a wireless LAN system. First, an overview of a wireless LAN system according to an embodiment of the present disclosure is described with reference to FIGS. 1 to 7.
(1-1. Configuration of Wireless LAN System)

FIG. 1 illustrates a configuration of a wireless LAN system according to an embodiment of the present disclosure. As illustrated in FIG. 1, the wireless LAN system according to an embodiment of the present disclosure includes APs 200 and STAs 100. Then, one AP 200 and one or more STAs 100 constitute a BSS 10.

The wireless LAN system according to an embodiment of the present disclosure may be installed in any place. For example, the wireless LAN system according to the present embodiment may be installed in office buildings, housing, commercial facilities, public facilities, or the like.

In addition, an area of the BSS 10 according to the present embodiment may overlap with an area of another BSS 10; in that case, a signal transmitted from the STA 100 located in the overlap area may interfere with a signal transmitted from the other BSS 10. When description is given using the example of FIG. 1, an area of the BSS overlaps with part of an area of the BSS 10b, and a signal transmitted from the STA 100b located in the overlap area may interfere with a signal transmitted from the AP 200b of the BSS 10b.

The AP 200 according to the present embodiment is a communication device that is connected to an external network, and provides communication with the external network for the STA 100. For example, the AP 200 is connected to the Internet, and provides communication between the STA 100 and a device on the Internet or a device connected via the Internet.

The STA 100 according to the present embodiment is a communication device that communicates with the AP 200. The STA 100 may be any communication device. For example, the STA 100 may be a display with a display function, a memory with a storage function, a keyboard and a mouse with an input function, a speaker with a sound output function, or a smartphone with a function of executing advanced calculation processing.
(1-2. Overview of Wireless Communication)

The configuration of the wireless LAN system according to the present embodiment has been described above. Now, an overview of wireless communication according to the present embodiment will be described. In the wireless LAN system according to the present embodiment, the AP 200 and the STA 100 communicate with each other. Here, although description is given on the assumption that the AP 200 and the STA 100 communicate with each other in this specification, the APs 200 may communicate with each other or the STAs 100 may communicate with each other, as appropriate.

An example of communication performed between the AP 200 and the STA 100 is described. In the case where the AP 200 transmits data, the AP 200 transmits an RTS 20 to the STA 100 before the data transmission. Then, the STA 100 that has received the RTS 20 transmits a CTS 30 to the AP 200 as a response frame to the RTS 20.

In the case where an STA 100 other than the STA 100 communicating the RTS and the CTS 30 with the AP 200 receives the RTS 20 or the CTS 30, the STA 100 sets an NAV so as to prevent occurrence of interference. The STA 100 that has set the NAV cannot transmit a signal during the set period.

Here, in a wireless LAN system, there are a method using one type of NAV and a method using a plurality of types of NAVs. The wireless LAN system according to the present embodiment uses two types of NAVs, i.e., Intra-BSS NAV that is an NAV for communication in the own BSS and Regular NAV that is an NAV for communication in another BSS. The STA 100 sets Intra-BSS NAV in the case of determining that the received RTS 20 or CTS 30 is a signal of the own BSS, and sets Regular NAV in the case of determining that the received RTS 20 or CTS 30 is not a signal of the own BSS. Here, Intra-BSS NAV functions as a first transmission suppression period, and Regular NAV functions as a second transmission suppression period.

The AP 200 that has received the CTS 30 from the STA 100 determines that the STA 100 is able to receive a signal, and transmits data to the STA 100. In the case where the STA 100 can receive data correctly, the STA 100 transmits an ACK to the AP 200. The AP 200 that has received the ACK transmits a frame for making notification of the end of a contention-free period (hereinafter referred to as "contention free-end (CF-End)" for convenience; denoted by "CFE" in the drawing). In the case of receiving the CF-End, the STA 100 that has set an NAV cancels the NAV. Note that in a scheme adopting a plurality of NAVs, the STA 100 cancels Intra-BSS NAV in the case of determining that the CF-End is a signal of the own BSS, and cancels Regular NAV in the case of determining that the CF-End is not a signal of the own BSS.

The above is the overview of a series of processes in communication between the AP 200 and the STA 100. Described above is an overview of processing when the AP 200 transmits data to the STA 100, and the device on the transmission side and the device on the reception side are reversed in the case where the STA 100 transmits data to the AP 200.

Figure 2:
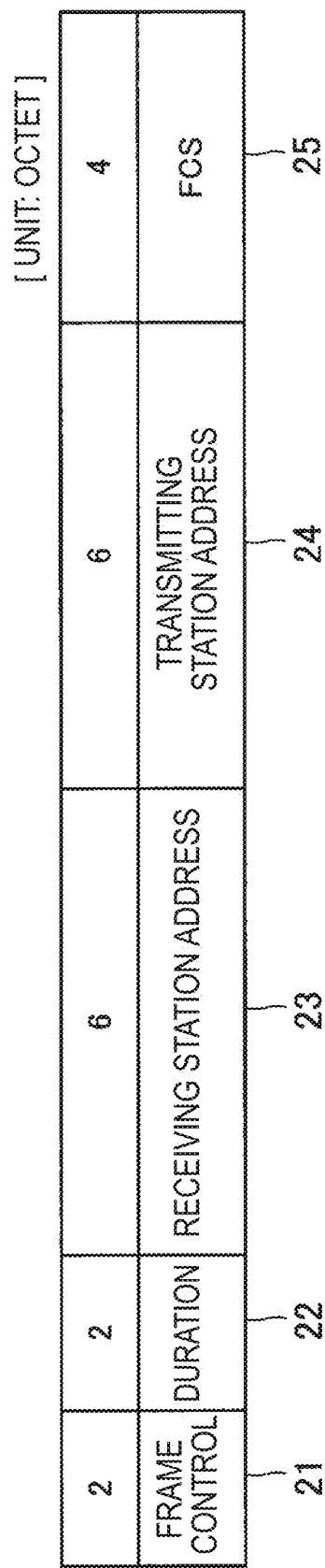
FIG. 2 illustrates a frame format of an RTS.

Then, frame formats of the RTS 20 and the CTS 30 communicated by the AP 200 and the STA 100 are described with reference to FIGS. 2 and 3. FIG. 2 illustrates a frame format of the RTS 20. As illustrated in FIG. 2, the RTS 20 includes information regarding frame control 21, duration 22, a receiving station address 23, a transmitting station address 24, and a frame check sequence (FCS) 25.

A device that has received the RTS 20 determines whether or not the own device is a transmission destination device of the RTS 20 on the basis of the receiving station address 23, and specifies a transmission source device of the RTS 20 on the basis of the transmitting station address 24. Here, it is assumed that the STA 100 knows address information of the AP 200 in the own BSS, and does not know address information of the STA 100 other than the own device in the own BSS. Consequently, in the case of receiving the RTS 20, the STA 100 determines that the RTS 20 is a signal of the own BSS on the basis of the fact that the address of the AP 200 is set in one of the receiving station address 23 and the transmitting station address 24 of the RTS 20.

In addition, although not illustrated, the CF-End also has a frame format similar to that of the RTS 20. More specifically, like the RTS 20, the CF-End includes information regarding frame control, duration, a receiving station address, a transmitting station address, and an FCS. The CF-End differs from the RTS 20 in that information regarding duration of the CF-End is 0 and the receiving station address is a broadcast address (FF:FF:FF:FF:FF:FF). A device that has received the CF-End specifies a transmission source device of the CF-End on the basis of the transmitting station address. In the case of receiving the CF-End from the AP 200, the STA 100 determines that the CF-End is a signal of the own BSS on the basis of the fact that the address of the AP 200 is set in the transmitting station address of the CF-End.

FIG. 3 illustrates a frame format of the CTS 30. As illustrated in FIG. 3, the CTS 30 includes information regarding frame control 31, duration 32, a receiving station address 33, and a frame check sequence (FCS) 34, but, unlike the RTS 20, does not include information regarding a transmitting station address. In addition, although not illustrated, the ACK also has a frame format similar to that of the CTS (1-3. Background)

The overview of wireless communication according to the present embodiment has been described above. Now, the background of the present disclosure will be described.

As described above, the STA 100 sets an NAV on the basis of reception of the RTS 20 or the CTS 30. More specifically, the STA 100 sets Intra-BSS NAV in the case of determining that the RTS 20 or the CTS 30 is a signal of the own BSS, and sets Regular NAV in the case of determining that the RTS 20 or the CTS 30 is not a signal of the own BSS.

Here, as described above, the CTS 30 does not include information regarding a transmitting station address. Consequently, for the STA 100 to determine whether or not the CTS 30 is a signal of the own BSS and set an NAV, the STA 100 is required to determine whether or not the CTS 30 is a signal of the own BSS on the basis of information other than the transmitting station address. If the STA 100 cannot determine whether or not the CTS 30 is a signal of the own BSS, Regular NAV will be set or updated, which may cause wasted waiting time or cause interference.

Figure 6:
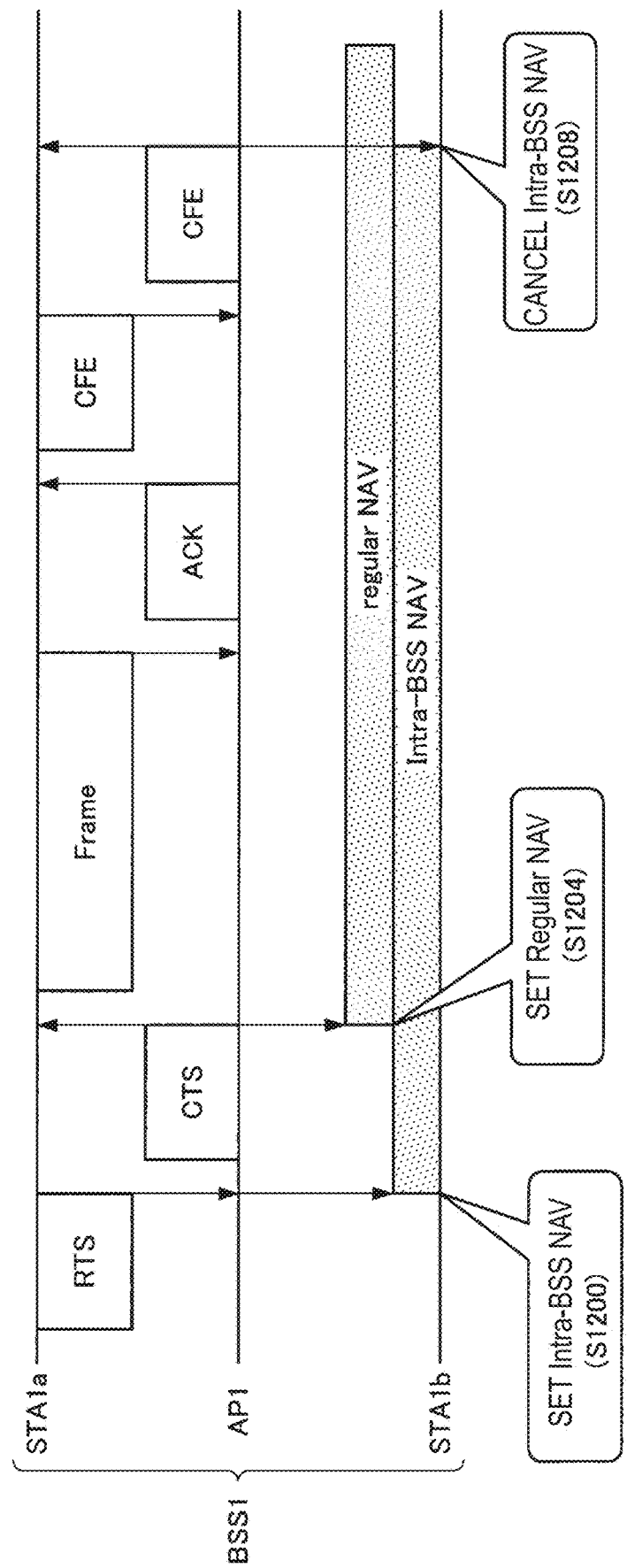
FIG. 6 illustrates a problem of the communication control using two types of NAVs.
Figure 7:
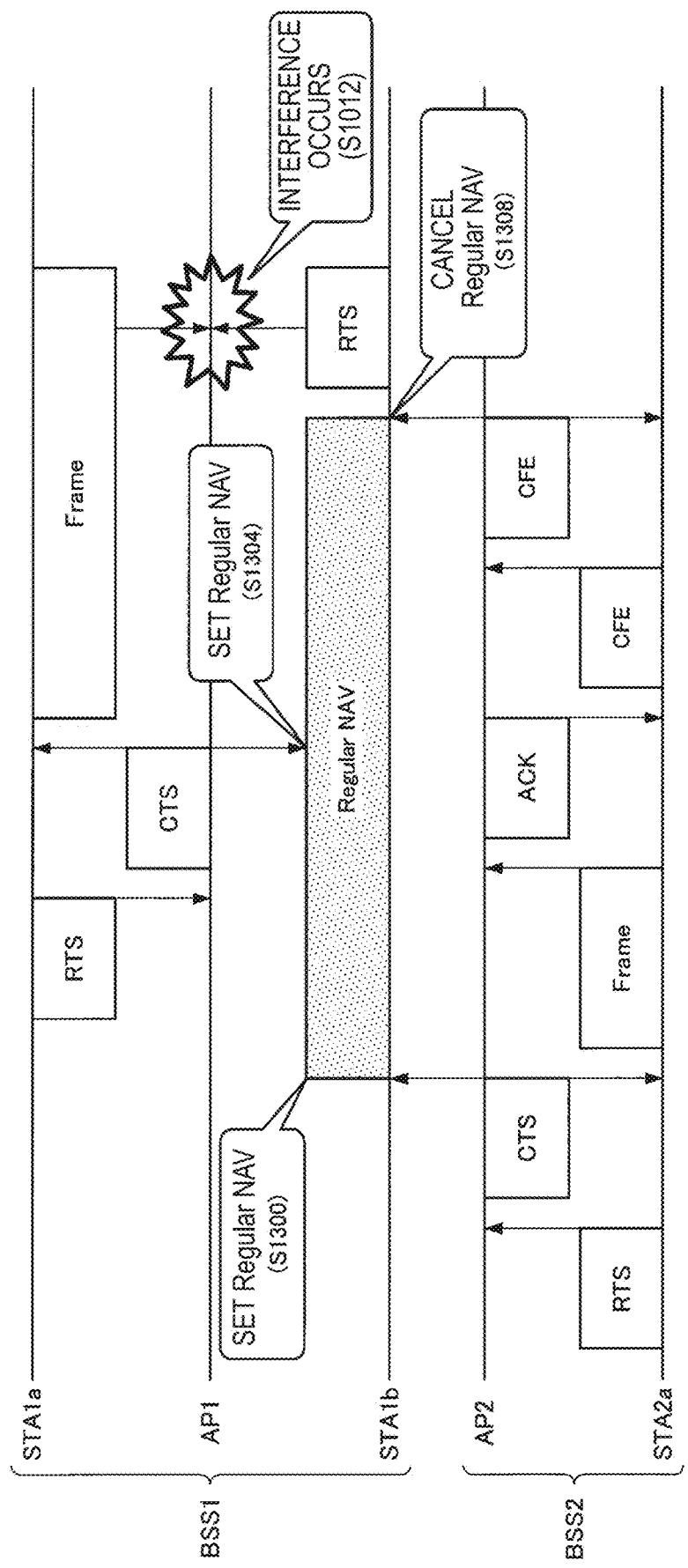
FIG. 7 illustrates a problem of the communication control using two types of NAVs.

Now, communication between the AP and the STA when one type of NAV is used will be described with reference to FIG. 4, and then, a case where wasted waiting time occurs or interference occurs in the case where two types of NAVs are used will be described with reference to FIGS. 5 to 7.

Figure 4:
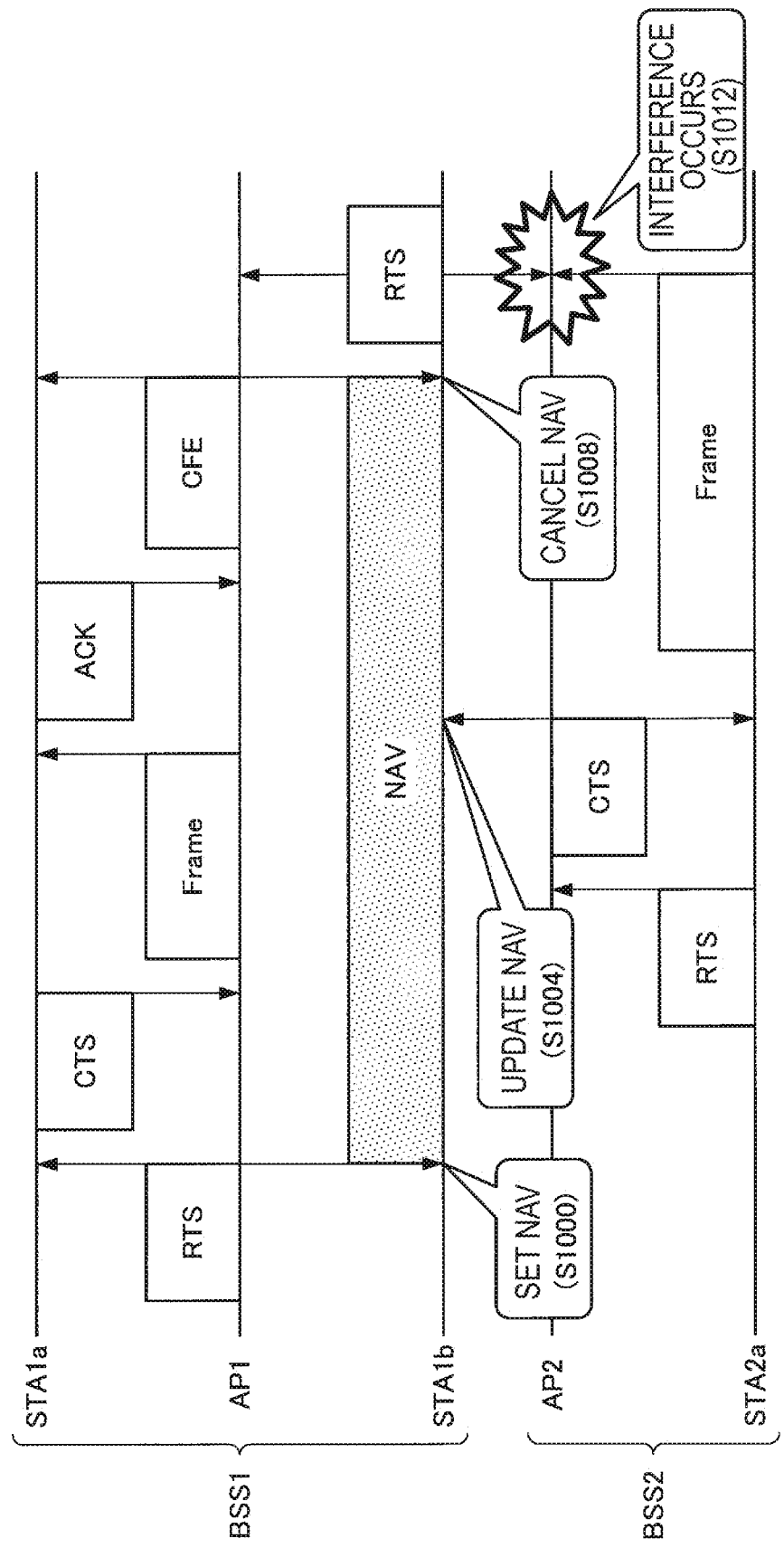
FIG. 4 illustrates communication control using one type of NAV.

FIG. 4 illustrates communication control using one type of NAV. As illustrated in FIG. 4, the following case is assumed: an area of a BSS 1 overlaps with part of an area of a BSS 2, and an STA 1*b* belonging to the BSS 1 is located in the overlap area. That is, the STA 1*b* receives a signal from both an AP 1 and an AP 2.

In step S1000 of FIG. 4, the STA 1*b* that has received an RTS from the AP 1 sets an NAV on the basis of duration information included in the RTS. In step S1004, the AP 2 that has received an RTS from the STA 2*a* transmits a CTS. In this case, not only the STA 2*a* but also STA 1*b* receives the CTS, and the STA 1*b* updates the NAV.

After communication between the AP 1 and the STA 1*a* is completed, the AP 1 transmits a CF-End. In step S1008, the STA 1*b* that has received the CF-End from the AP 1 cancels the NAV. In step S1012, interference may occur between an RTS transmitted by the STA 1*b* to perform data transmission after the NAV cancellation and a data frame transmitted by the STA 2*a*.

Figure 5:
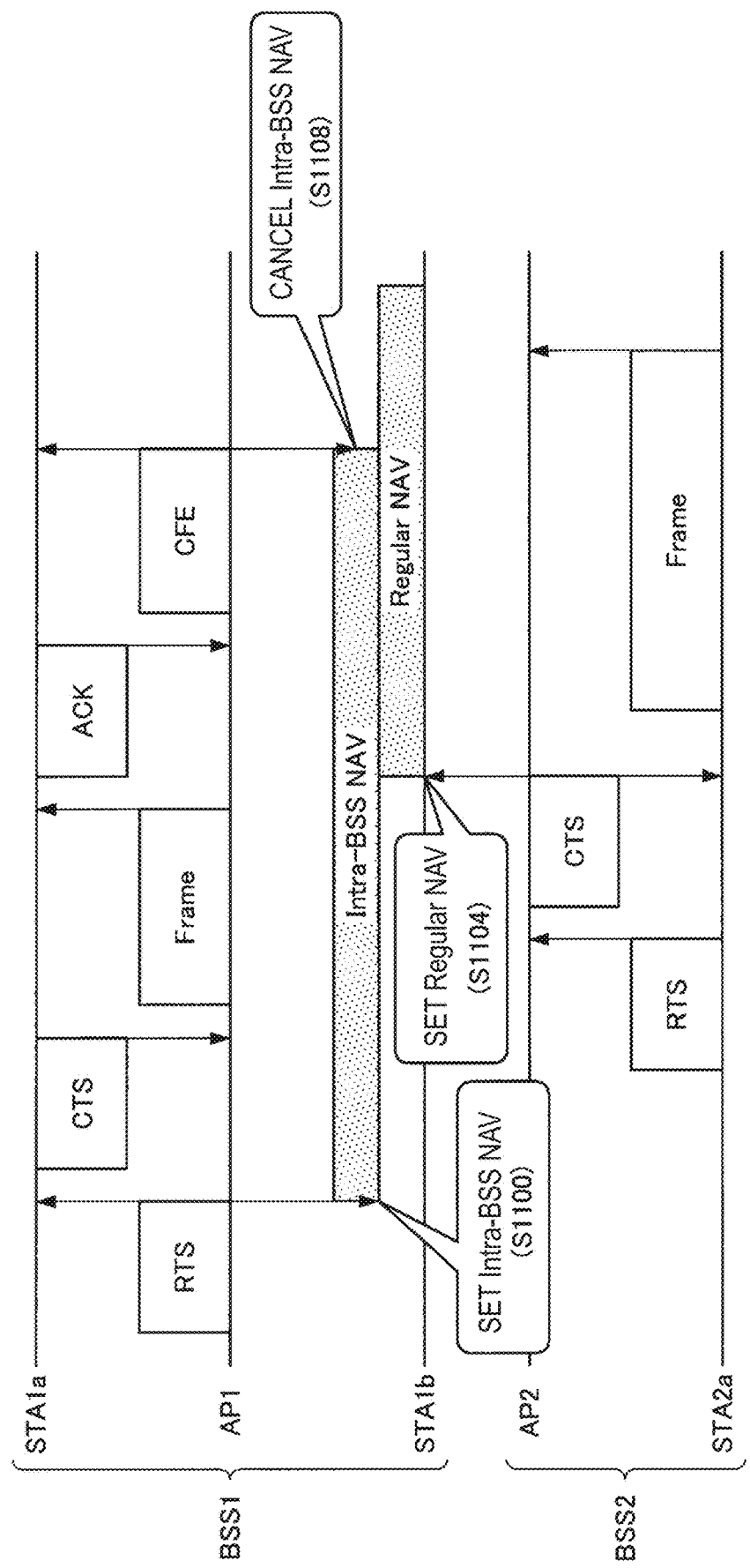
FIG. 5 illustrates communication control using two types of NAVs.

In addition to the communication control using one type of NAV illustrated in FIG. 4, communication control using two types of NAVs is considered as illustrated in FIG. 5. FIG. 5 illustrates communication control using two types of NAVs. As in the present embodiment, the STA of FIG. 5 can set Intra-BSS NAV and Regular NAV.

First, in step S1100 of FIG. 5, the STA 1*b* that has received an RTS from the AP 1 confirms that the RTS is a signal of the own BSS, and sets Intra-BSS NAV on the basis of duration information included in the RTS. In step S1104, the AP 2 that has received an RTS from the STA 2*a* transmits a CTS, and not only the STA 2*a* but also the STA 1*b* receives the CTS. Here, as described above, the STA 1*b* sets Regular NAV because it cannot determine whether or not the CTS is a signal of the own BSS. Then, in step S1108, the STA 1*b* that has received a CF-End from the AP 1 confirms that the CF-End is a signal of the own BSS, and cancels Intra-BSS NAV. Then, although not illustrated, for example, the AP 2 transmits a CF-End in the BSS 2, and the STA 1*b* that has received the CF-End confirms that the CF-End is not a signal of the own BSS, and cancels Regular NAV.

Then, a problem of the communication control using two types of NAVs is specifically described with reference to FIGS. 6 and 7. FIG. 6 illustrates a problem of the communication control using two types of NAVs.

First, in step S1200, the STA 1b that has received an RTS from the STA 1a sets Intra-BSS NAV on the basis of duration information included in the RTS. In step S1204, the AP 1 that has received the RTS from the STA 1a transmits a CTS. Then, the STA 1b that has received the CTS from the AP 1 sets Regular NAV on the basis of duration information included in the CTS, instead of updating Intra-BSS NAV, because it cannot grasp that the CTS is a signal transmitted from the BSS 1. After that, in step S1208, the STA 1b that has received a CF-End from the AP 1 cancels Intra-BSS NAV. Here, Regular NAV is kept being set until a period designated by the duration information included in the CTS ends, and the STA 1b cannot transmit a signal during that time. Thus, in a method using two types of NAVs, the STA cannot correctly determine whether or not a CTS is a signal of the own BSS, which may cause wasted waiting time.

Now, FIG. 7 will be described. FIG. 7 illustrates a problem of the communication control using two types of NAVs. First, in step S1300, the AP 2 that has received an RTS from the STA 2a transmits a CTS. The STA 1b that has received the CTS from the AP 2 sets Regular NAV on the basis of duration information included in the CTS. In step S1304, the AP 1 that has received an RTS from the STA 1a transmits a CTS. Then, the STA 1b that has received the CTS from the AP 1 updates Regular NAV, instead of setting Intra-BSS NAV, because it cannot grasp that the CTS is a signal transmitted from the own BSS. In step S1308, the STA 1b that has received a CF-End from the AP 2 cancels Regular NAV. After that, in step S1312, interference occurs between an RTS transmitted by the STA 1b to perform data transmission after the Regular NAV cancellation and a data frame transmitted by the STA 1a. Thus, in a method using two types of NAVs, the STA cannot correctly determine whether or not a CTS is a signal of the own BSS, which may cause interference.

Hence, the disclosing party of the present case has devised the present disclosure by focusing on the above circumstances. The wireless LAN system according to an embodiment of the present disclosure can determine whether or not a response frame is a signal transmitted from the own BSS. Here, although this specification mainly describes the CTS 30, which is a type of response frame, the present disclosure can also be applied to an ACK, which is another response frame. The case of applying the present disclosure to an ACK is described in detail in "7. Others". Note that the present disclosure ensures downward compatibility. That is, the STA 100 and the AP 200 according to the present embodiment has compatibility with an STA and an AP supporting a low order version.

2. Configuration of Device

Figure 8:
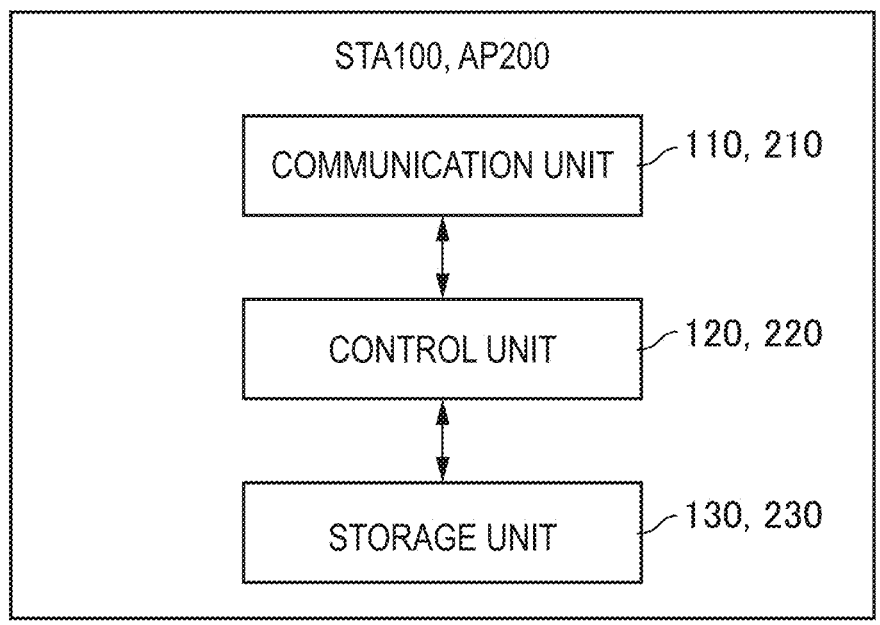
FIG. 8 illustrates configurations of an STA and an AP according to an embodiment of the present disclosure.

The background of the present disclosure has been described above. Now, a configuration of a device according to the present embodiment will be described with reference to FIG. 8. FIG. 8 illustrates configurations of the STA 100 and the AP 200 according to an embodiment of the present disclosure.

(2-1. Configuration of AP 200)

First, a configuration of the AP 200 is described. As illustrated in FIG. 8, the AP 200 includes a communication unit 210, a control unit 220, and a storage unit 230. The communication unit 210 functions as a transmission unit or a reception unit, and the control unit 220 functions as a generation unit, a specification unit, a version specification unit, or a transmission suppression period setting unit.

(Communication Unit 210)

The communication unit 210 performs processing of transmitting and receiving signals. Transmission processing is described more specifically. The communication unit 210 generates a transmission signal on the basis of control by the control unit 220. For example, the communication unit 210 is provided with a frame from the control unit 220 and has coding and modulation schemes and the like designated, to perform encoding, interleaving, and modulation, thereby generating a baseband transmission signal. In addition, the communication unit 210 performs up-conversion on the baseband transmission signal obtained by the preceding processing, and transmits the signal via an antenna.

Reception processing is described more specifically. The communication unit 210 receives a signal via an antenna, and performs analog processing and down-conversion on the signal, thereby outputting a baseband reception signal. Then, the communication unit 210 calculates correlation between one or two or more signal patterns and the reception signal, while shifting the reception signal that is a target of computation on a time axis, and detects a preamble on the basis of appearance of a peak of correlation. Thus, the communication unit 210 can detect the RTS 20, the CTS 30, a data frame, an ACK, a CF-End, or the like. In addition, the communication unit 210 performs demodulation, decoding, and the like on the baseband reception signal, thereby acquiring a frame, and provides the frame to the control unit 220.

(Control Unit 220)

The control unit 220 controls generation processing and transmission/reception processing for frames. More specifically, in the case of transmitting data, the control unit 220 generates the RTS 20, and causes the communication unit 210 to transmit the RTS 20. Then, in the case where the communication unit 210 receives the CTS 30, the control unit 220 generates a frame including transmission data, and causes the communication unit 210 to transmit the frame. After that, in the case where the communication unit 210 receives an ACK indicating that a frame is normally received, the control unit 120 generates a CF-End, and causes the communication unit 210 to transmit the CF-End.

In addition, the control unit 220, in the case of receiving data, when the communication unit 210 receives the RTS 20, the control unit 220 generates the CTS 30, and causes the communication unit 210 to transmit the CTS 30. Then, in the case where the communication unit 210 normally receives a data frame, the communication unit 210 generates an ACK, and causes the communication unit 110 to transmit the ACK. After that, the control unit 120 generates a CF-End, and causes the communication unit 110 to transmit the CF-End.

Here, in generating the CTS 30, the control unit 220 according to the present embodiment sets a value corresponding to a BSS to which the own device belongs in the receiving station address 33 included in the CTS 30. More specifically, the control unit 220 sets, in the receiving station address 33, information in which part of an MAC address of the destination STA 100 is omitted and BSS identification information of the BSS to which the own device belongs, which corresponds to a omitted data volume.

Figure 9:
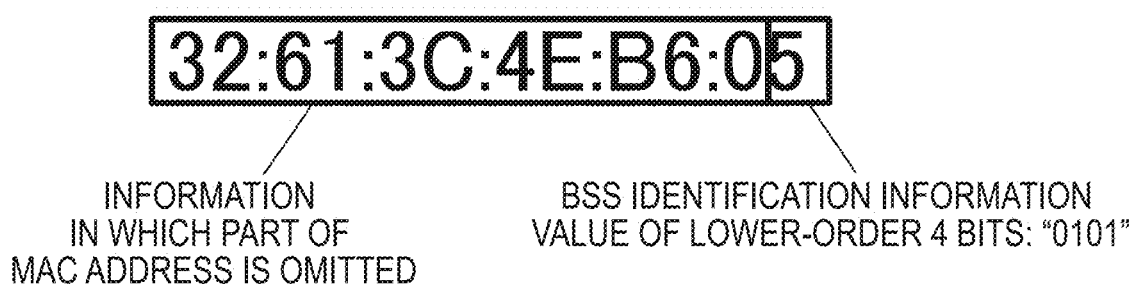
FIG. 9 illustrates an example of information set in a receiving station address of a response frame.

Here, an example of information set in the receiving station address 33 is described with reference to FIG. 9. FIG. 9 illustrates an example of information set in the receiving station address 33. For example, as illustrated in FIG. 9, the control unit 220 omits lower-order 4 bits of the MAC address of the destination STA 100, and sets BSS identification information having 4 bits (a bit string of "0101" in the example of FIG. 9) at a position where the bits are omitted.

The information illustrated in FIG. 9 is an example, and the number of bits of BSS identification information may be any number. For example, the number of bits of BSS identification information may be set on the basis of the number of other BSSs adjacent to the own BSS. More specifically, in the case where the number of other BSSs adjacent to the own BSS is small (e.g., smaller than a predetermined number), the control unit 220 may reduce the number of bits of BSS identification information to the number of bits enough for the own BSS and other BSSs to be identified from each other. For example, in the case where three other BSSs are adjacent to the own BSS, the control unit 220 may reduce the number of bits of BSS identification information to the number of bits enough for four BSSs including the own BSS to be identified from each other (i.e., 2 bits). Thus, the control unit 220 can reduce the number of bits of the MAC address to be omitted, which enables a larger number of STAs 100 to be identified.

In addition, a position at which BSS identification information is set in the receiving station address 33 may be any position. For example, the position at which BSS identification information is set may be a higher-order position or an intermediate position, instead of a lower-order position of the receiving station address 33. Furthermore, BSS identification information may be information called BSS color.

As described above, by the control unit 220 including BSS identification information in the receiving station address 33, the STA 100 that has received the CTS can determine whether or not the CTS 30 is a signal of the own BSS. In addition, the control unit 220 includes BSS identification information in the receiving station address 33, instead of the frame control 31, the duration 32, or the FCS 34 of the CTS which can reduce the possibility that the STA 100 that has received the CTS 30 malfunctions. More specifically, the MAC address of the destination STA 100 is normally set in the receiving station address 33. Here, MAC addresses of a plurality of STAs 100 present in a range in which the AP 200 can perform communication are not highly likely to be similar to each other; hence, even in the case where the AP 200 sets information in which part of the MAC address of the destination STA 100 is omitted in the receiving station address 33, the destination STA 100 is highly likely to be specified by the MAC address with an omission. On the other hand, for example, in the case where the AP 200 omits partial information of the frame control 31 in order to include BSS identification information, the STA 100 that has received the CTS 30 may malfunction. According to the above, the control unit 220 can reduce the possibility that the STA 100 that has received the CTS 30 malfunctions. Details of determination processing of the STA 100 will be described later.

In addition, in the case where the desired STA 100 cannot be designated with only information in which part of the MAC address of the STA 100 is omitted, the control unit 220 may add additional identification information. More specifically, in the case where there is a plurality of STAs 100 specified by information in which part of the MAC address is omitted, the control unit 220 may further omit part of the MAC address, and add identification information for identifying the plurality of STAs 100, which corresponds to the omitted data volume.

For example, in FIG. 9, in the case where there are two STAs 100 specified by information in which part of the MAC address is omitted (i.e., information other than BSS identification information), the control unit 220 may further omit part of the MAC address by 1 bit, and add identification information of 1 bit in order to identify the two STAs 100. In this case, the AP 200 notifies each STA 100 of the number of bits and setting position of the identification information and identification information assigned to each STA 100. Thus, the control unit 220 can designate the desired STA 100 as a destination even in the case where there is a plurality of STAs 100 specified by information in which part of the MAC address is omitted.

(Storage Unit 230)

The storage unit 230 stores various types of information. More specifically, the storage unit 230 stores various parameters, received data, transmission data, or the like that is used for transmission/reception processing. In addition, the storage unit 230 stores BSS identification information and identification information (MAC address etc.) of the own device and each STA 100.

(2-2. Configuration of STA 100)

Now, a configuration of the STA 100 will be described. As illustrated in FIG. 8, the STA 100 includes a communication unit 110, a control unit 120, and a storage unit 130. The communication unit 110 functions as a transmission unit or a reception unit, and the control unit 120 functions as a generation unit, a specification unit, a version specification unit, or a transmission suppression period setting unit.

(Communication Unit 110)

The communication unit 110 has a function similar to that of the communication unit 210 of the AP 200; hence, description is omitted.

(Control Unit 120)

The control unit 120 controls generation processing and transmission/reception processing for frames. Here, these pieces of processing are similar to those of the control unit 220 of the AP 200; hence, description is omitted.

In addition, the control unit 120 controls setting processing and canceling processing for NAVs. NAV setting processing is described more specifically. In the case where the RTS 20 or the CTS 30 is received, the control unit 120 determines whether or not the frame is a signal of the own BSS. Then, the control unit 120 sets Intra-BSS NAV in the case of determining that the frame is a signal of the own BSS, and sets Regular NAV in the case of determining that the frame is not a signal of the own BSS.

Now, description will be given on a method for determining whether or not the RTS 20 or the CTS 30 is a signal of the own BSS. First, a method for determining whether or not the RTS 20 is a signal of the own BSS is described. As described above, the RTS 20 includes the receiving station address 23 and the transmitting station address 24 in the frame. Then, the control unit 120 of the STA 100 that has received the RTS 20 determines whether or not the RTS 20 is a signal of the own BSS on the basis of whether or not one of the receiving station address 23 and the transmitting station address 24 includes address information of the AP 200.

Then, a method for determining whether or not the CTS 30 is a signal of the own BSS is described. As described above, the AP 200 sets, in the receiving station address 33 of the CTS 30, information in which part of the MAC address of the destination STA 100 is omitted and BSS identification information corresponding to a omitted data volume. Then, the control unit 120 of the STA 100 that has received the CTS 30 can determine whether or not the CTS 30 is a signal of the own BSS on the basis of BSS identification information set in the receiving station address 33.

More specifically, the control unit 120 knows BSS identification information of the own BSS, and compares the BSS identification information with BSS identification information included in the receiving station address 33. Then, the control unit 120 can determine that the CTS 30 is a signal of the own BSS in the case where the two pieces of BSS identification information are the same or equivalent, and the control unit 120 can determine that the CTS 30 is not a signal of the own BSS in the case where the two pieces of BSS identification information are not the same or not equivalent. In addition, in the case where the MAC address of the AP 200 of the own BSS is set in the receiving station address 33 of the CTS 30, the control unit 120 determines that the CTS 30 is a signal of the own BSS.

Figure 10:
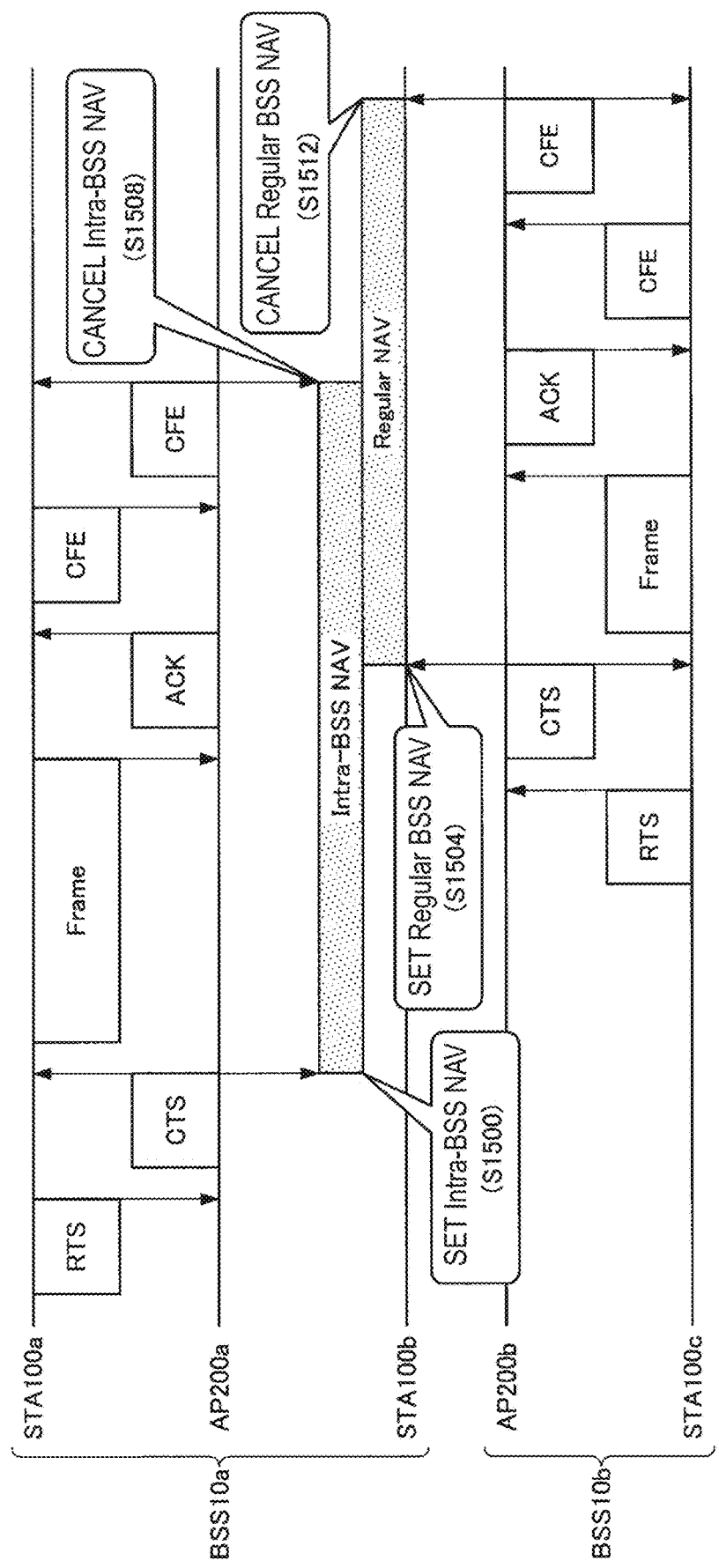
FIG. 10 illustrates communication control using two types of NAVs in an embodiment of the present disclosure.

Here, setting processing and canceling processing for NAVs by the control unit 120 according to the present embodiment is described with reference to FIG. 10. FIG. 10 illustrates communication control using two types of NAVs in an embodiment of the present disclosure.

In step S1500, the STA 100b that has received the CTS 30 from the AP 200a can determine that the CTS 30 is a signal of the own BSS by the above method, and sets Intra-BSS NAV on the basis of the duration 32 included in the CTS 30. In step S1504, the STA 100b that has received the CTS 30 from the AP 200b can determine that the CTS 30 is not a signal of the own BSS by the above method, and sets Regular NAV on the basis of the duration 32 included in the CTS 30.

In step S1508, the STA 100b that has received a CF-End from the AP 200a confirms that the CF-End is a signal of the own BSS, and cancels Intra-BSS NAV. In step S1512, the STA 100b that has received a CF-End from the AP 200b confirms that the CF-End is not a signal of the own BSS, and cancels Regular NAV.

As described above, the control unit 120 according to the present embodiment can determine whether or not the CTS 30 is a signal of the own BSS on the basis of BSS identification information included in the receiving station address 33 of the CTS 30. In addition, in including BSS identification information in the receiving station address 33, a frame format of the CTS 30 is not changed from a frame format of a low order version; hence, a device supporting a low order version can also appropriately process the CTS 30. That is, the present disclosure can ensure downward compatibility.

(Storage unit 130)

The storage unit 130 has a function similar to that of the storage unit 230 of the AP 200; hence, description is omitted.

3. Operation of STA 100

Figure 11:
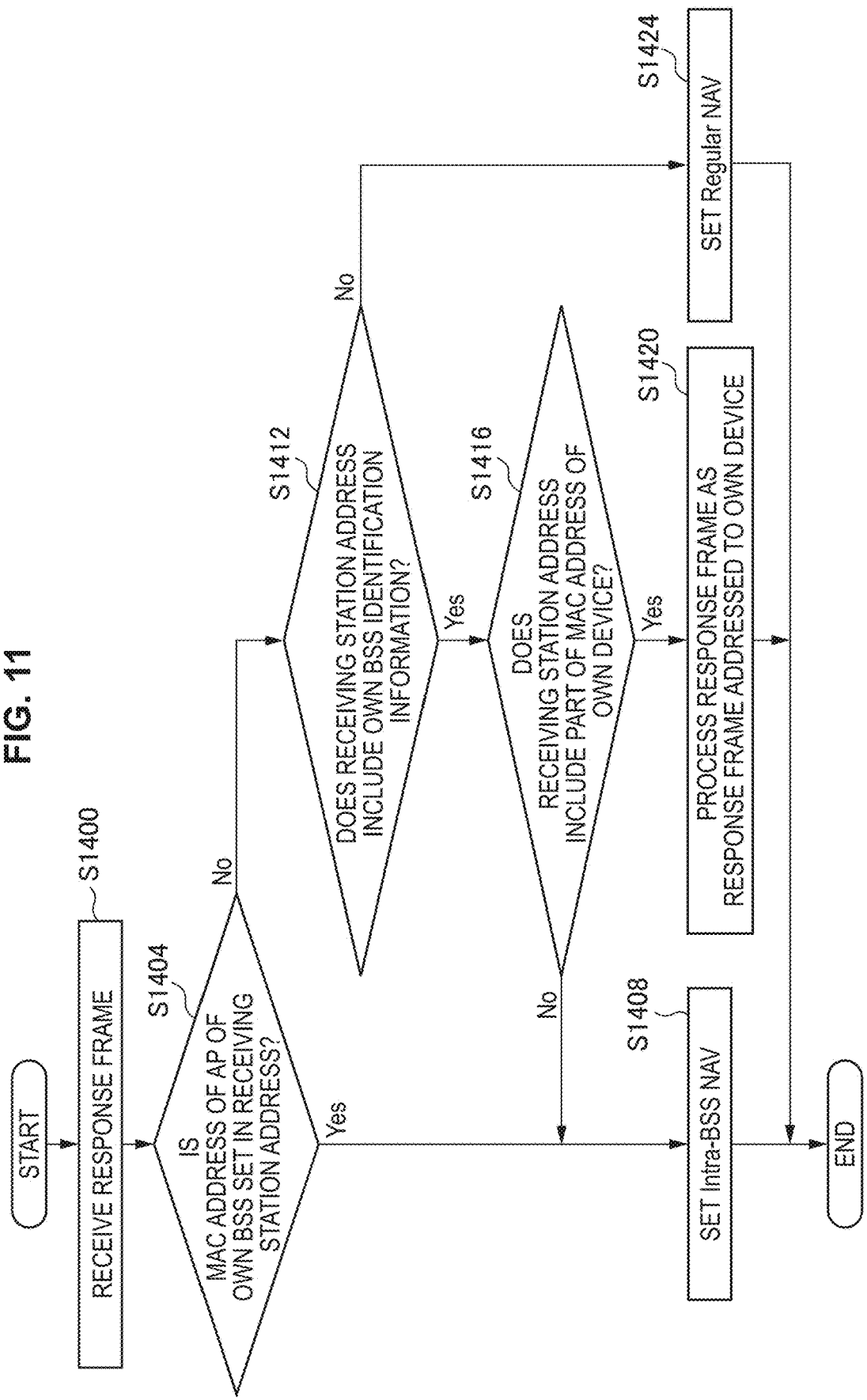
FIG. 11 is a flowchart illustrating operation when an STA according to an embodiment of the present disclosure receives a response frame.

The configuration of the device according to the present embodiment has been described above. Now, operation of the STA 100 according to the present embodiment will be described with reference to FIG. 11. FIG. 11 is a flowchart illustrating operation when the STA 100 according to an embodiment of the present disclosure receives a response frame.

In step S1400, the communication unit 110 of the STA 100 receives the CTS which is a response frame. In step S1404, the control unit 120 checks whether or not the MAC address of the AP 200 of the own BSS is set in the receiving station address 33. In the case where the MAC address of the AP 200 of the own BSS is set in the receiving station address 33 (Yes in step S1404), in step S1408, the control unit 120 determines that the CTS 30 is a signal of the own BSS, sets Intra-BSS NAV on the basis of the duration 32 of the CTS 30, and reception processing ends. In the case where the MAC address of the AP 200 of the own BSS is not set in the receiving station address 33 in step S1404 (No in step S1404), in step S1412, the control unit 120 checks whether or not the receiving station address 33 includes BSS identification information of the own BSS.

In the case where the receiving station address 33 includes BSS identification information of the own BSS (Yes in step S1412), in step S1416, the control unit 120 checks whether or not the receiving station address 33 includes information in which part of the MAC address of the own device is omitted. In the case where the receiving station address 33 includes information in which part of the MAC address of the own device is omitted (Yes in step S1416), in step S1420, the control unit 120 determines that the CTS 30 is the CTS 30 addressed to the own device and performs various types of processing, and reception processing ends. In the case where the receiving station address 33 does not include information in which part of the MAC address of the own device is omitted in step S1416 (No in step S1416), in step S1408, the control unit 120 determines that the CTS 30 is a signal of the own BSS, sets Intra-BSS NAV on the basis of the duration 32 of the CTS 30, and reception processing ends.

In the case where the receiving station address 33 does not include BSS identification information of the own BSS in step S1412 (No in step S1412), in step S1424, the control unit 120 determines that the CTS 30 is not a signal of the own BSS, sets Regular NAV on the basis of the duration 32 of the CTS 30, and reception processing ends.

4. First Modification

The operation of the STA 100 according to the present embodiment has been described above. Now, a first modification of the present disclosure will be described with reference to FIG. 12. The first modification of the present disclosure is a case where the AP 200 sets, in the receiving station address 33 of the CTS 30, an address assigned for each STA 100 (hereinafter referred to as "assigned address" for convenience) and BSS identification information. Here, an assigned address is an address assigned for each STA 100 by the AP 200 in order to uniquely specify each STA 100, and the AP 200 can identify each STA 100 by using the assigned address in place of the MAC address. Notification of the assigned address is made from the AP 200 to each STA 100 when the STA 100 connects to the AP 200 (at the time of association), together with other parameters.

Figure 12:
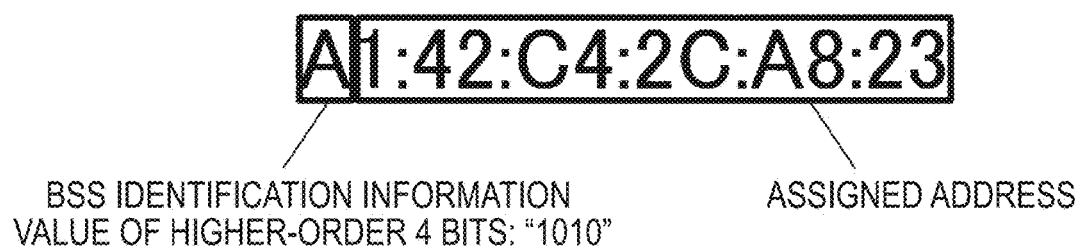
FIG. 12 illustrates an example of information set in a receiving station address of a response frame in a first modification of the present disclosure.

FIG. 12 illustrates an example of information set in a receiving station address of a response frame in the first modification of the present disclosure. As illustrated in FIG. 12, in the first modification, the AP 200 includes an assigned address and BSS identification information in the receiving station address 33 of the CTS 30. Here, the information illustrated in FIG. 12 is an example, and as in the above embodiment, the number of bits of BSS identification information and a position at which BSS identification information is set in the receiving station address 33 may be any number and any position. In addition, although FIG. 12 illustrates an example in which an assigned address without an omission is set in the receiving station address 33, information in which part of the assigned address is omitted may be set. For example, the AP 200 assigns an assigned address having the same bit length as the MAC address for each STA 100. Then, the AP 200 may set, in the receiving station address 33, information in which part of the assigned address of the destination STA 100 is omitted and BSS identification information corresponding to a omitted data volume.

Here, in the above embodiment, in the case where there is a plurality of STAs 100 specified by information in which part of the MAC address is omitted, the AP 200 further omits part of the MAC address, and adds identification information for identifying the plurality of STAs 100, which corresponds to the omitted data volume. On the other hand, in the first modification of the present disclosure, the AP 200 can skip such processing. More specifically, the AP 200 can prevent occurrence of a situation in which there is a plurality of STAs 100 specified by the assigned address, by assigning assigned addresses not overlapping with each other to the STAs 100.

5. Second Modification

The first modification of the present disclosure has been described above. Now, a second modification of the present disclosure will be described with reference to FIGS. 13 and 14. The second modification of the present disclosure is a case where the AP 200 sets, in the receiving station address 33 of the CTS 30, wireless LAN version identification information and BSS identification information. More specifically, the AP 200 sets, in the receiving station address 33, information in which part of the MAC address of the destination STA 100 is omitted, and wireless LAN version identification information and BSS identification information, which correspond to a omitted data volume. Here, wireless LAN version identification information is information indicating whether or not the CTS 30 is a signal supporting a version of a wireless LAN according to the present embodiment.

Figure 13:
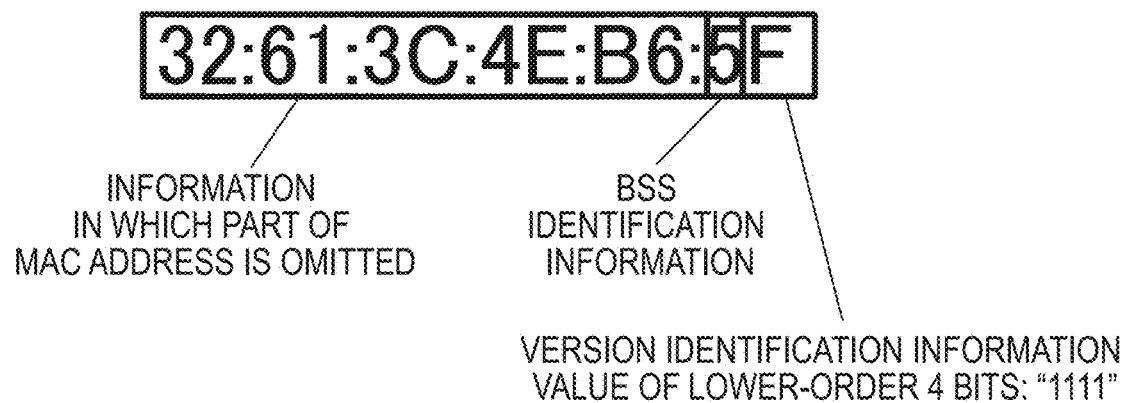
FIG. 13 illustrates an example of information set in a receiving station address of a response frame in a second modification of the present disclosure.

Here, information set in the receiving station address 33 of the CTS 30 in the second modification of the present disclosure is described with reference to FIG. 13. FIG. 13 illustrates an example of information set in the receiving station address 33 of a response frame in the second modification of the present disclosure. In the example illustrated in FIG. 13, wireless LAN version identification information is set in lower-order 4 bits of the receiving station address 33. For example, in the case where wireless LAN version identification information is a bit string of "1111", the STA 100 that has received the CTS 30 determines that the CTS 30 is a signal supporting a version of a wireless LAN according to the present embodiment. Then, in the case where wireless LAN version identification information is not a bit string of "1111", the STA 100 determines that the CTS 30 is not a signal supporting a version of a wireless LAN according to the present embodiment.

Note that wireless LAN version identification information may indicate a version of a wireless LAN supported by the CTS 30. For example, wireless LAN version identification information may be a bit string indicating each version (IEEE802.11ac, IEEE802.11ad, IEEE802.11ax, etc.) of IEEE802.11. Note that a version of a wireless LAN according to the present embodiment is assumed to be IEEE802.11ax, and a low order version is assumed to be a version developed earlier than IEEE802.11ax in this specification, but they are not limited to these versions.

The second modification is particularly effective in a case where devices supporting various versions of wireless LANs are mixed in the BSS 10. For example, the following case is assumed: an STA supporting a version of a lower order than a version of a wireless LAN according to the present embodiment (hereinafter referred to as "legacy STA" for convenience) belongs to the same BSS 10 as the STA 100 supporting a version of a wireless LAN according to the present embodiment.

The legacy STA recognizes information set in a receiving station address of a CTS as the MAC address of the destination device. Consequently, the AP 200 does not include BSS identification information in a receiving station address of a CTS addressed to the legacy STA, and sets the MAC address of the legacy STA without omission. Thus, the legacy STA can appropriately process the CTS. That is, in the case where the STA 100 according to the present embodiment and the legacy STA are mixed in the BSS 10, the AP 200 transmits the CTS 30 including BSS identification information in the receiving station address 33 and a CTS not including BSS identification information.

Here, by the receiving station address 33 including wireless LAN version identification information, the STA 100 according to the present embodiment can determine whether or not a received signal is the CTS 30 according to the present embodiment. In the case of determining that the received signal is the CTS 30 according to the present embodiment on the basis of wireless LAN version identification information, the STA 100 can perform processing such as reading of BSS identification information and reading of the MAC address with an omission. Then, the STA 100 sets Intra-BSS NAV in the case of determining that the CTS 30 is a signal of the own BSS on the basis of BSS identification information, and sets Regular NAV in the case of determining that the CTS 30 is not a signal of the own BSS.

In addition, in the case of determining that the received signal is not the CTS according to the present embodiment (i.e., is a CTS addressed to the legacy STA), the STA 100 can be prevented from performing processing such as reading of BSS identification information and reading of the MAC address with an omission. That is, the STA 100 can be prevented from determining that a CTS is not a signal of the own BSS on the basis of the fact that the receiving station address of the CTS does not include BSS identification information of the own BSS. In the case of determining that the received signal is not the CTS 30 according to the present embodiment, the STA 100 determines that all received CTSs are signals of the own BSS, or determines that none of received CTSs are signals of the own BSS. The STA 100 sets Intra-BSS NAV in the case of determining that all received CTSs are signals of the own BSS, and sets Regular NAV in the case of determining that none of received CTSs are signals of the own BSS.

For example, in the case where the number of legacy STAs belonging to the BSS 10 is small (e.g., smaller than a predetermined number), the STA 100 may determine that none of received CTSs are signals of the own BSS and set Regular NAV. In addition, in the case where the number of legacy STAs belonging to the BSS 10 is large (e.g., larger than a predetermined number) or the case where there is no other BSS interfering with the own BSS, the STA 100 may determine that all received CTSs are signals of the own BSS and set Intra-BSS NAV.

Here, the information illustrated in FIG. 13 is an example, and the number of bits of each of version identification information and BSS identification information and a position at which each piece of information is set in the receiving station address 33 may be any number and any position. In addition, although FIG. 13 illustrates an example in which the MAC address with an omission is set, an assigned address or an assigned address with an omission may be set in the receiving station address 33 by application of the first modification to the second modification. This can prevent occurrence of a situation in which there is a plurality of STAs 100 specified by the MAC address with an omission.

Figure 14:
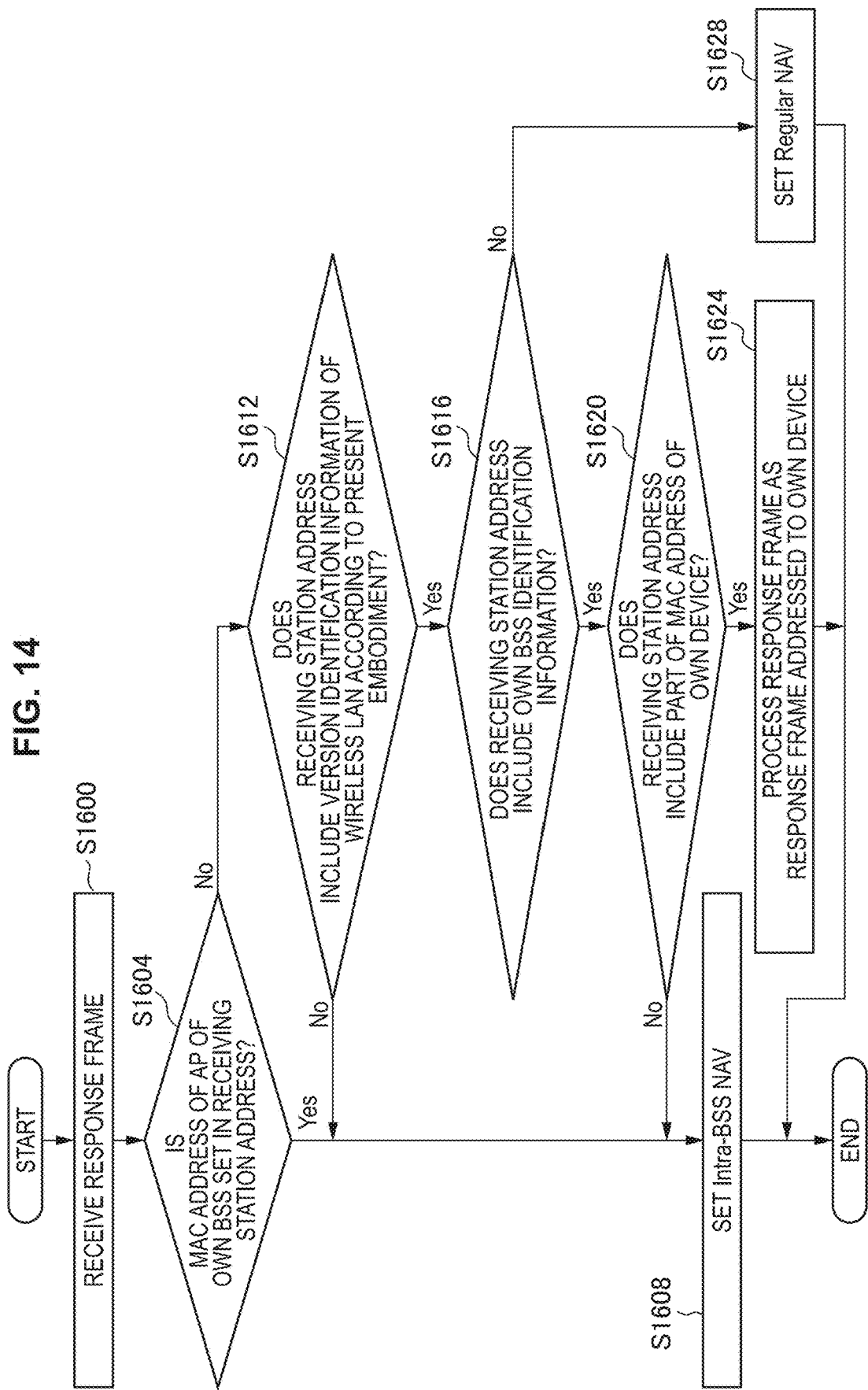
FIG. 14 is a flowchart illustrating operation when an STA according to a second modification of the present disclosure receives a response frame.

FIG. 14 is a flowchart illustrating operation when the STA 100 according to the second modification of the present disclosure receives a response frame. FIG. 14 illustrates the following case: in the case of determining that a received signal is not the CTS 30 according to a version of a wireless LAN of the present embodiment, the STA 100 determines that all the signals are signals of the own BSS and sets Intra-BSS NAV. A difference from the flowchart illustrated in FIG. 11 is that, in step S1612, the control unit 120 of the STA 100 checks whether or not the receiving station address includes version identification information of a wireless LAN according to the present embodiment. In the case where the receiving station address includes version identification information of a wireless LAN according to the present embodiment (Yes in step S1612), in step S1616, the control unit 120 checks whether or not the receiving station address 33 includes BSS identification information of the own BSS. Subsequent processing is similar to that in FIG. 11; hence, description is omitted. In the case where the receiving station address does not include version identification information of a wireless LAN according to the present embodiment (No in step S1612), in step S1608, the control unit 120 sets Intra-BSS NAV on the basis of the duration of the CTS, and reception processing ends.

6. Application Examples

The technology according to the present disclosure can be applied to various products. For example, the STA 100 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation devices. In addition, the STA 100 may be realized as terminals that perform machine to machine (M2M) communication (also referred to as machine type communication (MTC) terminals) such as smart meters, vending machines, remotely controlled monitoring devices, or point of sale (POS) terminals. Furthermore, the STA 100 may be wireless communication modules mounted in such terminals (for example, integrated circuit modules configured by one die).

On the other hand, for example, the AP 200 may be realized as a wireless LAN access point (also referred to as a wireless base station) which has a router function or does not have a router function. The AP 200 may be realized as a mobile wireless LAN router. The AP 200 may also be a wireless communication module (for example, an integrated circuit module configured with one die) mounted on such devices.

(6-1. First Application Example)

Figure 15:
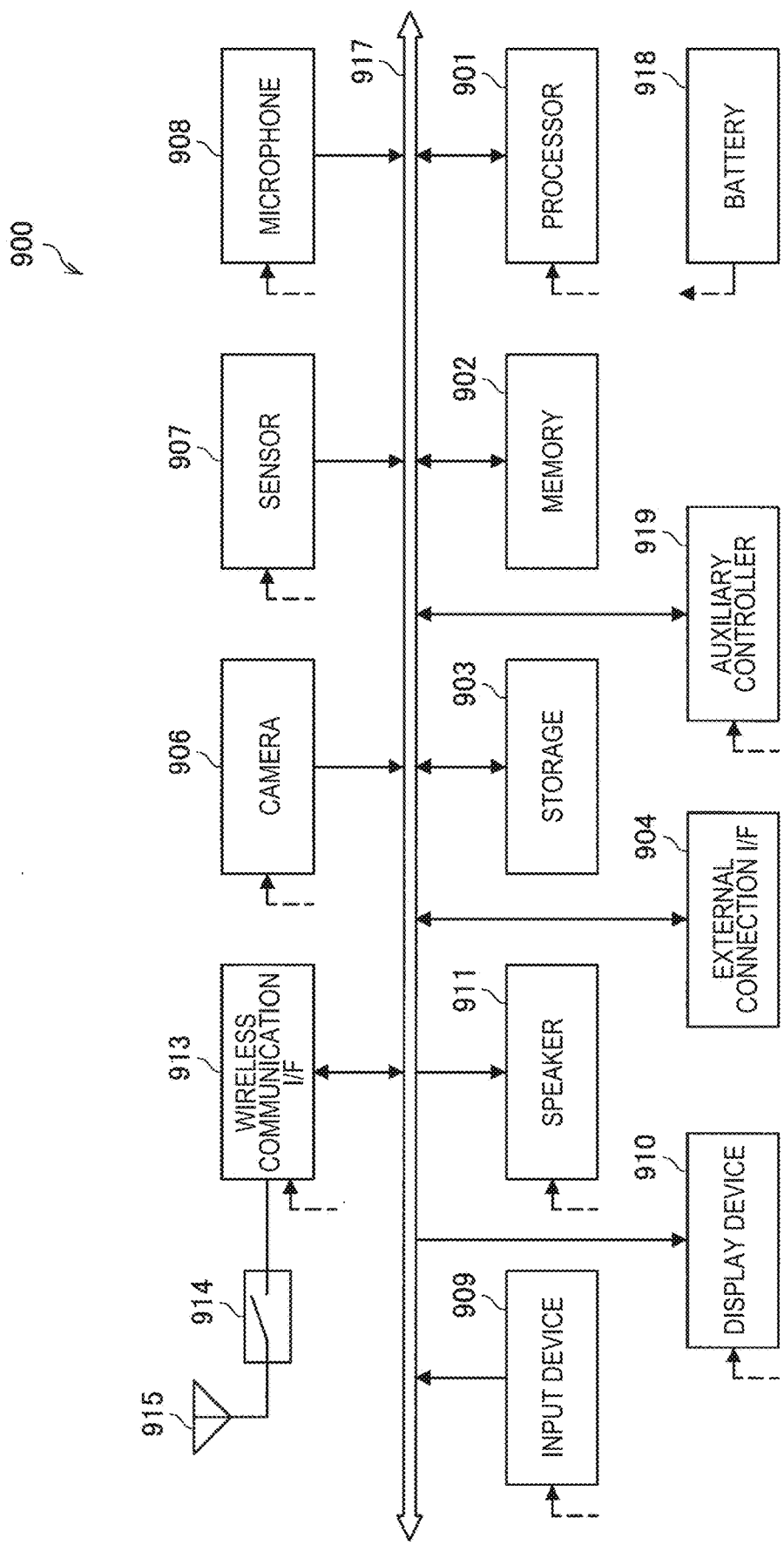
FIG. 15 is a block diagram illustrating an example of a schematic configuration of a smartphone.

FIG. 15 is a block diagram illustrating an example of a schematic configuration of a smartphone 900 to which the technology of the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes random access memory (RAM) and read only memory (ROM), and stores data and programs executed by the processor 901. The storage 903 can include a storage medium such as a semiconductor memory or a hard disk. The external connection interface 904 is an interface for connecting an externally attachable device such as a memory card or a universal serial bus (USB) device to the smartphone 900.

The camera 906 has an image sensor, for example, a charge coupled device (CCD) or a complementary metal oxide semiconductor (CMOS), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive operation or information input from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, 11ad, and 11ax, to establish wireless communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Note that, Wi-Fi Direct is different from the ad hoc mode. One of two terminals operates as an access point, and communication is performed directly between the terminals. The wireless communication interface 913 can typically include a baseband processor, a radio frequency (RF) circuit, a power amplifier, and the like. The wireless communication interface 913 may be a one-chip module on which a memory that stores a communication control program, a processor that executes the program, and a relevant circuit are integrated. The wireless communication interface 913 may support another kind of wireless communication scheme such as a cellular communication scheme, a near-field communication scheme, or a proximity wireless communication scheme in addition to the wireless LAN scheme. The antenna switch 914 switches a connection destination of the antenna 915 among a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals through the wireless communication interface 913.

Note that the smartphone 900 may include a plurality of antennas (for example, antennas for a wireless LAN or antennas for a proximity wireless communication scheme, or the like), without being limited to the example of FIG. 15. In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 with each other. The battery 918 supplies electric power to each of the blocks of the smartphone 900 illustrated in FIG. 15 via power supply lines partially indicated by dashed lines in the drawing. The auxiliary controller 919 causes, for example, necessary minimum functions of the smartphone 900 to be operated in a sleep mode.

Note that the smartphone 900 may operate as a wireless access point (software AP) as the processor 901 executes the function of an access point at an application level. In addition, the wireless communication interface 913 may have the function of a wireless access point.

(6-2. Second Application Example)

Figure 16:
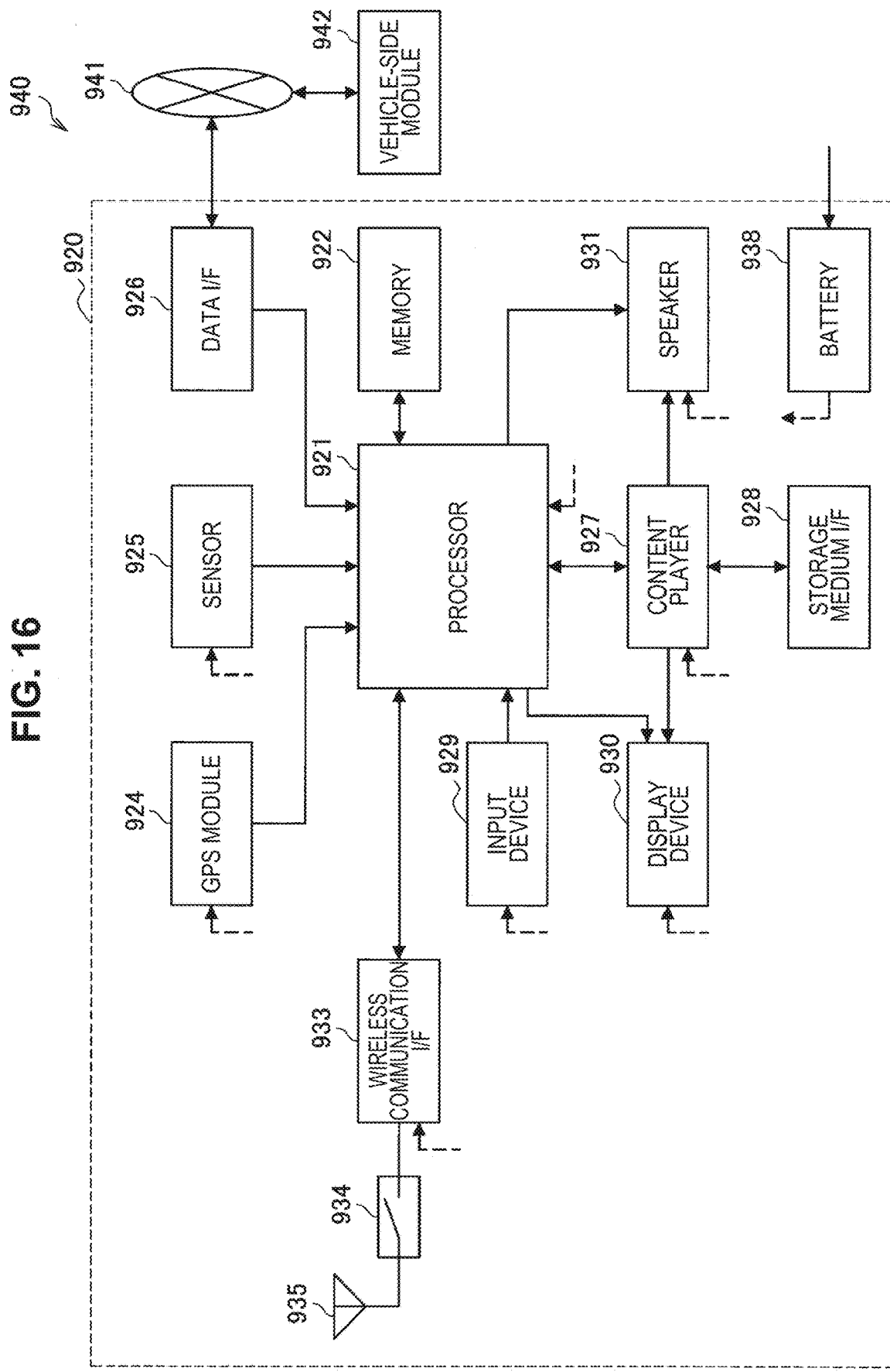
FIG. 16 is a block diagram illustrating an example of a schematic configuration of a car navigation device.

FIG. 16 is a block diagram illustrating an example of a schematic configuration of a car navigation device 920 to which the technology of the present disclosure can be applied. The car navigation device 920 includes a processor 921, a memory 922, a Global Positioning System (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes RAM and ROM storing data and programs executed by the processor 921.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected with an in-vehicle network 941 via, for example, a terminal (not illustrated) to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive operation or information input from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11 ac, 11ad, 11ax, and the like to execute wireless communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a one-chip module on which a memory that stores a communication control program, a processor that executes the program, and a relevant circuit are integrated. The wireless communication interface 933 may support another kind of wireless communication scheme such as a near-field communication scheme, a proximity wireless communication scheme, or the cellular communication scheme in addition to the wireless LAN scheme. The antenna switch 934 switches a connection destination of the antenna 935 among a plurality of circuits included in the wireless communication interface 933. The antenna 935 has a single or a plurality of antenna elements and is used for transmission and reception of wireless signals from and to the wireless communication interface 933.

Note that the car navigation device 920 may include a plurality of antennas, without being limited to the example of FIG. 16. In this case, the antenna switch 934 may be omitted from the configuration of the car navigation device 920.

The battery 938 supplies electric power to each of the blocks of the car navigation device 920 illustrated in FIG. 16 via power supply lines partially indicated by dashed lines in the drawing. In addition, the battery 938 accumulates electric power supplied from the vehicle side.

In addition, the wireless communication interface 933 may operate as the AP 200 described above, and provide wireless communication for a terminal of a user on the vehicle.

Further, the technology of the present disclosure may be realized as an in-vehicle system (or a vehicle) 940 including one or more blocks of the above-described car navigation device 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

(6-3. Third Application Example)

Figure 17:
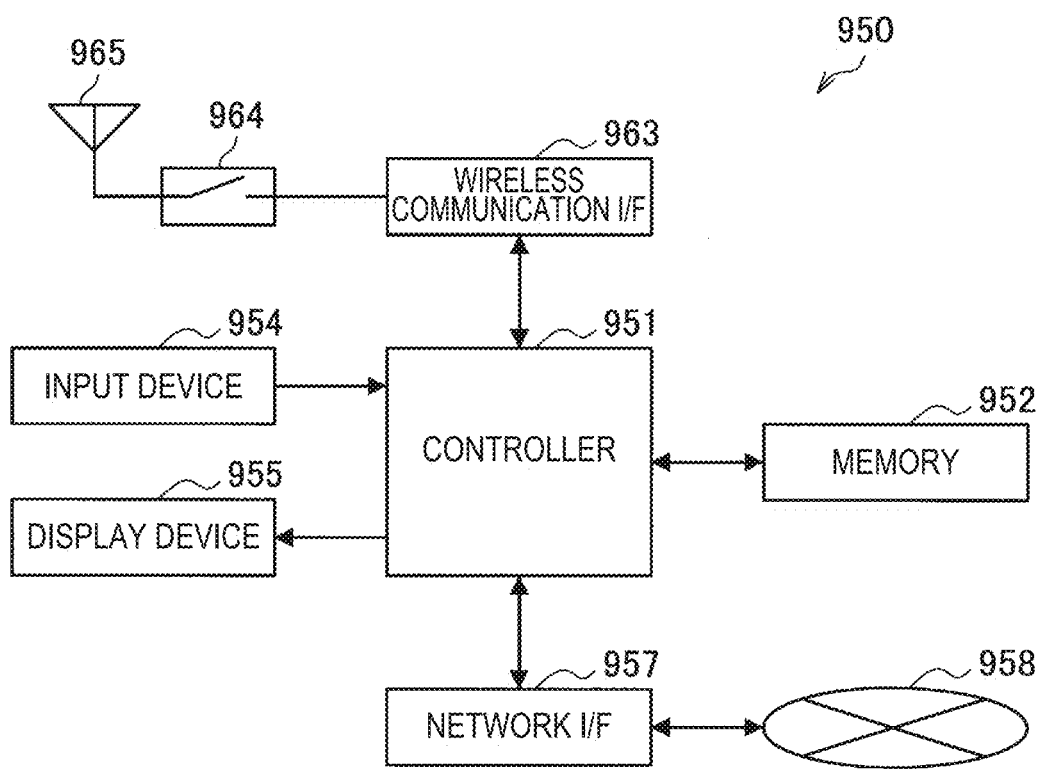
FIG. 17 is a block diagram illustrating an example of a schematic configuration of a wireless access point.

FIG. 17 is a block diagram illustrating an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes RAM and ROM and stores a program executed by the controller 951 and various kinds of control data (for example, a terminal list, a routing table, an encryption key, security settings, and a log).

The input device 954 includes, for example, a button or a switch, and receives operation performed by a user. The display device 955 includes an LED lamp and displays an operation status of the wireless access point 950.

The network interface 957 is a wired communication interface that connects the wireless access point 950 with a wired communication network 958. The network interface 957 may include a plurality of connection terminals. The wired communication network 958 may be a LAN such as Ethernet (registered trademark) or may be a wide area network (WAN).

The wireless communication interface 963 supports one or more wireless LAN standards of IEEE 802.11a, 11b, 11g, 11n, 11ac, 11ad, flax, and the like to supply wireless connection to a nearby terminal as an access point. The wireless communication interface 963 can typically include a baseband processor, an RF circuit, and a power amplifier. The wireless communication interface 963 may be a one-chip module in which memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

7. Others

Mainly described above is a case where the present disclosure is applied to the CTS 30, which is a type of response frame. Here, the present disclosure can be applied to an ACK, which is a type of response frame, as well as the CTS 30. More specifically, as in the above embodiment, the AP 200 can set BSS identification information, an MAC address with a partial omission, an assigned address, wireless LAN version identification information, or the like in a receiving station address of an ACK.

An embodiment in which the present disclosure is applied to an ACK is particularly effective in a case where an NAV is set by an ACK. For example, in the case of not being able to receive the RTS 20 and the CTS 30 for some sort of reason, and receiving an ACK transmitted after them, the STA 100 can determine whether or not the ACK is a signal of the own BSS on the basis of BSS identification information included in the receiving station address of the ACK. Then, the STA 100 sets Intra-BSS NAV in the case of determining that the ACK is a signal of the own BSS, and sets Regular NAV in the case of determining that the ACK is not a signal of the own BSS. Note that in this case, a value other than 0 is set in the duration included in the ACK. Thus, the STA 100 can reduce the possibility of occurrence of interference even in an unstable communication environment in which the RTS 20 and the CTS 30 cannot be received but an ACK can be received.

In addition, an embodiment in which the present disclosure is applied to an ACK is particularly effective also in a case where preparation for data transmission/reception is performed by small data and an ACK, instead of a case where preparation for data transmission/reception is performed by the RTS 20 and the CTS 30. More specifically, in the case where the STA 100 transmits data, the STA 100 transmits small data, instead of the RTS 20, to the AP 200 before transmitting the data. The AP 200 that has received the small data transmits an ACK to the STA 100, and the STA 100 that has received the ACK determines that data transmission is permitted, and transmits data to the AP 200.

At this time, in the case where the STA 100 other than the STA 100 that transmits data receives an ACK, the STA 100 can determine whether or not the ACK is a signal of the own BSS on the basis of BSS identification information included in the receiving station address of the ACK. Then, the STA 100 sets Intra-BSS NAV in the case of determining that the ACK is a signal of the own BSS, and sets Regular NAV in the case of determining that the ACK is not a signal of the own BSS. Note that also in this case, a value other than 0 is set in the duration included in the ACK. Thus, the STA 100 can reduce the possibility of occurrence of interference even in the case where preparation for data transmission/reception is performed by small data and an ACK.

8. Conclusion

As described above, the AP 200 according to an embodiment of the present disclosure can set BSS identification information in a receiving station address of a response frame; thus, the STA 100 that has received a response frame can determine whether or not the response frame is a signal transmitted from the own BSS on the basis of BSS identification information. In addition, the AP 200 according to the first modification can set an assigned address as well as BSS identification information in the receiving station address, which can prevent occurrence of a situation in which there is a plurality of STAs 100 specified by the MAC address with an omission. In addition, the AP 200 according to the second modification can set wireless LAN version identification information as well as BSS identification information in the receiving station address; thus, the STA 100 that has received a response frame can determine whether or not the response frame is a signal supporting a version of a wireless LAN according to the present embodiment.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, steps in the operation of the STA 100 according to the present embodiment need not be always processed in chronological order in accordance with the order described as a flow chart. That is, steps in the processing of the STA 100 may be processed in an order different from the order described as a flow chart, or may be concurrently processed. For example, step S1404, step S1412, and step S1416 of FIG. 11 may be processed in a different order, or may be concurrently processed.

In addition, part of the configuration of the STA 100 may be provided outside the STA 100 as appropriate. Similarly, part of the configuration of the AP 200 may be provided outside the AP 200 as appropriate.

In addition, some functions of the STA 100 may be implemented by the control unit 120. For example, the control unit 120 may implement some functions of the communication unit 110. Similarly, some functions of the AP 200 may be implemented by the control unit 220. For example, the control unit 220 may implement some functions of the communication unit 210.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication device including:

a generation unit configured to generate a response frame prescribed in IEEE802.11 by setting a value corresponding to a BSS to which the own device belongs in a receiving station address field of the response frame; and a transmission unit configured to transmit the response frame.

(2)

The communication device according to (1), in which the value is a value set on the basis of address information and BSS identification information of a receiving station.

(3)

The communication device according to (2), in which the address information is an MAC address of the receiving station or an address assigned for each receiving station.

(4)

The communication device according to (3), in which the value includes information in which part of the address information is omitted and the BSS identification information equal to or less than a data volume of the omission.

(5)

The communication device according to (4), in which the value includes wireless LAN version identification information equal to or less than the data volume of the omission.

(6)

The communication device according to any one of (1) to (5), in which the response frame is a CTS frame or an ACK frame.

(7)

A communication control method executed by a computer, including:

generating a response frame prescribed in WEE802.11 by setting a value corresponding to a BSS to which an own device belongs in a receiving station address field of the response frame; and transmitting the response frame.

(8)

A program causing a computer to implement:

generating a response frame prescribed in WEE802.11 by setting a value corresponding to a BSS to which an own device belongs in a receiving station address field of the response frame; and transmitting the response frame.

(9)

A communication device including:

a reception unit configured to receive a response frame that is prescribed in WEE802.11 and includes a value corresponding to a BSS in a receiving station address field; and a specification unit configured to specify whether or not the response frame is a signal of an own BSS on the basis of the value.

(10)

The communication device according to (9), in which the value is a value set on the basis of address information and BSS identification information of a receiving station.

(11)

The communication device according to (10), in which the address information is an MAC address of the receiving station or an address assigned for each receiving station.

(12)

The communication device according to (11), in which the value includes information in which part of the address information is omitted and the BSS identification information equal to or less than a data volume of the omission.

(13)

The communication device according to (12), in which the value includes wireless LAN version identification information equal to or less than the data volume of the omission, and the communication device further includes a version specification unit configured to specify a version of the response frame on the basis of the version identification information.

(14)

The communication device according to (13), in which in a case where the version specification unit specifies that the version of the response frame is a version of a lower order than IEEE802.11ax, the specification unit specifies that all the response frames are signals of the own BSS or specifies that none of the response frames are signals of the own BSS.

(15)

The communication device according to any one of (9) to (14), in which the response frame is a CTS frame or an ACK frame.

(16)

The communication device according to any one of (9) to (15), further including a transmission suppression period setting unit configured to set a first transmission suppression period in a case where the specification unit determines that the response frame is a signal of the own BSS, and set a second transmission suppression period in a case where the specification unit determines that the response frame is not a signal of the own BSS.

(17)

A communication control method executed by a computer, including:

receiving a response frame that is prescribed in IEEE802.11 and includes a value corresponding to a BSS in a receiving station address field; and specifying whether or not the response frame is a signal of an own BSS on the basis of the value.

(18)

A program causing a computer to implement:

receiving a response frame that is prescribed in IEEE802.11 and includes a value corresponding to a BSS in a receiving station address field; and specifying whether or not the response frame is a signal of an own BSS on the basis of the value.

REFERENCE SIGNS LIST

100 STA
110 communication unit
120 control unit
130 storage unit
200 AP
210 communication unit
220 control unit
230 storage unit

The invention claimed is:

1. An access point device comprising:
circuitry configured to transmit, to a receiving station, a response frame that is prescribed in IEEE802.11, the response frame having an address field of the receiving station that comprises a first part and a second part,
wherein the first part includes a portion of a receiving station media access control (MAC) address,
wherein the second part contains replacement values that replace a remainder of the receiving station MAC address, and
wherein the replacement values comprise:
a first value corresponding to a basic service set (BSS); and
a second value used to distinguish the receiving station from another receiving station having a portion of a corresponding MAC address that is identical to the portion of the receiving station MAC address.

2. The access point device according to claim 1, wherein the second part further includes IEEE802.11 version information.

3. The access point device according to claim 1, wherein the response frame is a clear to send (CTS) frame or an acknowledgement (ACK) frame received in response to a request to send (RTS) frame received from the receiving station.

4. The access point device according to claim 3, wherein the response frame is the CTS frame or the ACK frame when the first part and the second part do not equal the MAC address of the access point device and when the first part and the second part uniquely identify the receiving station.

5. The access point device according to claim 1, wherein an Intra-BSS network allocation vector (NAV) is set when the first part and the second part equal the receiving station MAC address.

6. The access point device according to claim 1, wherein:
a first transmission suppression period is set when the first part and the second part do not equal the MAC address of the access point device and when the first part and the second value uniquely identify the receiving station, and
a second transmission suppression period is set in a case when the first part and the second part do not equal the MAC address of the access point device and when the first part and the second part do not uniquely identify the receiving station.

7. A communication control method executed by an access point device, the method comprising:
transmitting, to a receiving station, a response frame that is prescribed in IEEE802.11, the response frame having an address field of a receiving station that comprises a first part and a second part,
wherein the first part includes a portion of a receiving station media access control (MAC) address,
wherein the second part contains replacement values that replace a remainder of the receiving station MAC address, and
wherein the replacement values comprise:
a first value corresponding to a basic service set (BSS); and
a second value used to distinguish the receiving station from another receiving station having a portion of a corresponding MAC address that is identical to the portion of the receiving station MAC address.

8. The communication control method according to claim 7, wherein the second part further includes IEEE802.11 version information.

9. The communication control method according to claim 7, wherein the response frame is a clear to send (CTS) frame or an acknowledgement (ACK) frame received in response to a request to send (RTS) frame received from the receiving station.

10. The communication control method according to claim 9, wherein the response frame is the CTS frame or the ACK frame when the first part and the second part do not equal the MAC address of the access point device and when the first part and the second part uniquely identify the receiving station.

11. The communication control method according to claim 7, wherein an Intra-BSS network allocation vector (NAV) is set when the first part and the second part equal the receiving station MAC address.

12. The communication control method according to claim 7, wherein:
a first transmission suppression period is set when the first part and the second part do not equal the MAC address of the access point device and when the first part and the second value uniquely identify the receiving station, and
a second transmission suppression period is set in a case when the first part and the second part do not equal the MAC address of the access point device and when the first part and the second part do not uniquely identify the receiving station.

* * * * *